Sept. 19, 1961     F. D. PIAZZA, JR     3,000,208
STRAIN GAUGE
Filed Oct. 6, 1958
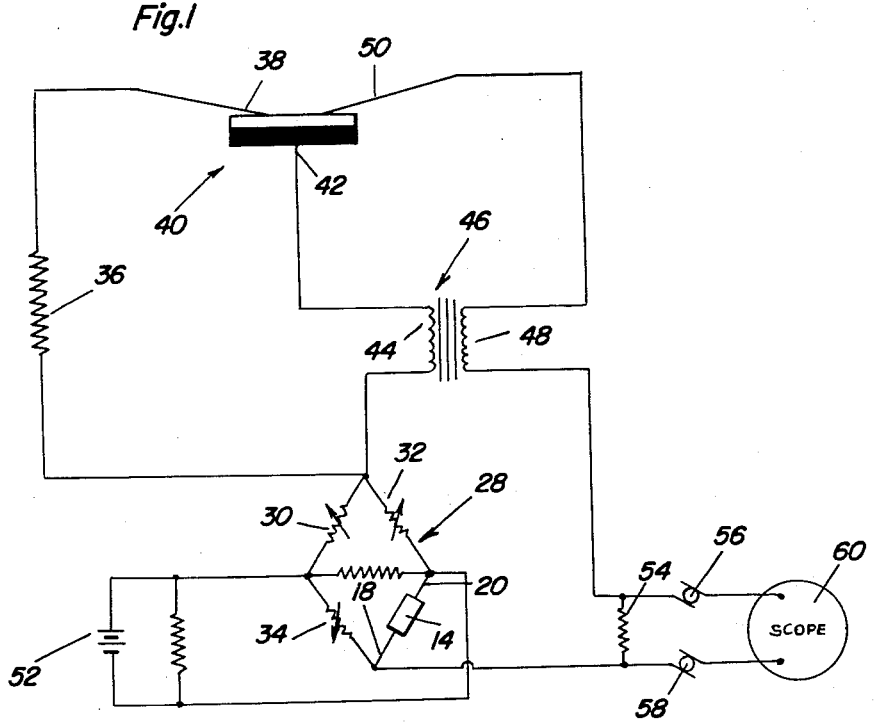
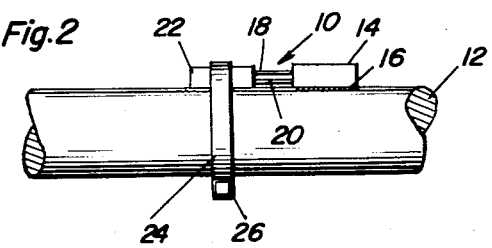
Frank D. Piazza, Jr.
INVENTOR.
BY *Clarence A. O'Brien*
*and Harvey B. Jacobson*
Attorneys

United States Patent Office 3,000,208
Patented Sept. 19, 1961

3,000,208
STRAIN GAUGE
Frank D. Piazza, Jr., 1101 Heeney St., Johnstown, Pa.
Filed Oct. 6, 1958, Ser. No. 765,415
5 Claims. (Cl. 73—136)

This invention relates generally to gauges and more particularly to a novel method of measuring strain in rotating shafts.

It is well known that when a shaft is rotated at high speeds, the shaft is strained, that is configurated slightly, due to the rotation force or torsion. Depending on the material utilized, a particular shaft is able to withstand a particular maximum strain due to the rotational force before the shaft is permanently disfigured and rendered inoperative. Formulas have been developed, indicating the maximum allowable strain in a shaft of a certain material having certain dimensions. Though it is comparatively easy to compute the maximum allowable strain in a shaft, it is not quite so easy to determine whether the strain in an actual shaft approaches the maximum. Numerous types of strain gauges have been developed to measure the strain in a rotating shaft. However, certain short comings are evident in all of these measuring devices. One of the more recent devices utilizes the concept of measuring an electrical resistance change in a standard resistance gauge bonded to the shaft and relating the change in resistance due to the shaft rotation, to the physical strain. With the standard resistance gauge bonded to the shaft, commutation means utilizing slip rings and brushes are employed to carry the electrical current from a source to the standard resistance gauge on the rotating shaft and back to a measuring device. Since the electrical resistance of the slip rings and brushes readily changes as they mechanically wear, and since the slip rings and brushes are electrically in series with the standard resistance gauge, the mechanical wear and resistance change of the commutation means results in significantly inaccurate results. That is, an accurate measurement of the resistance change of the standard resistance gauge could not be made because the standard resistance gauge could not be electrically isolated from the commutation resistance which was variable and unreliable. Precise measurements of strain in rotating shafts therefore is still not easily accomplished. Accordingly, the applicant has developed a novel method of utilizing the variation in electrical resistance due to the rotationally induced strain to obtain strain measurements more accurate than heretofore known.

It is the principal object of this invention to provide a novel method of measuring the strain in a rotating shaft.

It is a further object of this invention to provide a novel method of more accurately than heretofore known measuring the strain in a rotating shaft.

It is a still further object of this invention to provide a novel method of measuring the strain of a rotating shaft which is reliable, simple, and relatively inexpensive to employ.

In accordance with the above stated objects, below is particularly described the novel method developed by the applicant for accurately measuring the strain of a rotating shaft. A known resistance gauge is bonded to the shaft but electrically insulated therefrom. The bond must be of such quality that the known resistance gauge will be subjected to the same strain as proximate portions of the shaft. A miniature electric oscillatory circuit, preferably employing a transistor element, is strapped or fixed to the shaft adjacent the known resistance gauge. The known resistance gauge is electrically connected in the oscillatory circuit in such a manner that a resistance change of the known resistance gauge will vary the frequency output of the oscillatory circuit. The output of the oscillatory circuit is then electrically connected to commutation means, to a detection device which may, for instance, be a frequency meter or an oscilloscope. It is to be noted that the resistance change in the present invention, of the known resistance gauge results in a frequency change in output and not an amplitude change. Therefore, the varying commutation resistance will not effect the electrical output and an accurate measurement of the resistance change of the gauge will be possible. Likewise, an accurate measurement of the shaft strain will be deducible from the resistance measurements.

Further refinements of this invention would eliminate the commutation means entirely, by utilizing a transistor transmitter electrically connected to the oscillatory circuit for transmitting the oscillatory circuit frequency to a receiver.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 illustrates a schematic wiring diagram which may be utilized in conjunction with the inventive method disclosed; and FIGURE 2 is a fragmentary elevational view of a shaft carrying the known resistance gauge and circuit elements whereby a strain test may be performed on the shaft.

With continuing reference to the drawings the numeral 10 generally represents the strain gauge equipment which may be utilized in the performance of the novel method hereinafter disclosed. In order to determine the strain on a rotating shaft 12, a known resistance gauge 14 is securely bonded as at 16 to the shaft 12. The known resistance gauge 14 must be electrically insulated from the shaft 12 so as to prevent electric current travelling through the known resistance gauge 14 from passing to shaft 12. A pair of leads 18 and 20 electrically connect the known resistance gauge 14 to an oscillatory circuit package 22 which is carried by the shaft 12, as by a steel band 24 clamped by bolts 26.

Referring now to FIGURE 1, the known resistance gauge 14 is preferably electrically connected as one arm of an electrical bridge 28 having variable resistance arms 30, 32 and 34. A point on the bridge 28 is electrically connected through resistance 36 to the emitter 38 of a transistor 40. The transistor output is fed through the base 42 to a primary winding 44 of a transformer 46. The secondary winding 48 of the transformer 46 impresses the base voltage upon the collector 50. With a direct current electrical source 52 electrically connected as shown, the transistor 40 tends to oscillate. The oscillator frequency is impressed across resistor 54, through the ring and brush sets 56 and 58 to a scope 60 or frequency meter. It should be apparent that resistance variation in the commutation means 56 and 58, will not affect the oscillatory frequency of the transistor 40 and the frequency will be dependent upon the circuit parameters which are fixed and the known resistance gauge 14 whose resistance will vary dependent upon the strain therein. Therefore, by determining the frequency variation of the oscillatory circuit, an indication of the resistance variation in gauge 14 may be made. Since the resistance variation is dependent upon the rotationally induced strain, the strain may be determined by relating the strain to resistance.

It should further be apparent that any oscillatory circuit which may be made compactly enough to be carried by the shaft 12 may be utilized in conjunction with the gauge 14 in the same manner as noted above for the oscillatory circuit shown. The particular values of the various circuit parameters are subject to specific design considerations including desired accuracy and magnitude of strain.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a strain measuring system for measuring the strain on a rotatable member and adapted to convey strain indicating signals to a remotely located strain indicator by conventional means, a strain responsive resistor, said resistor bonded to said rotatable member, an electrical bridge circuit, said resistor comprising one arm of said bridge circuit and an oscillator circuit connected to said bridge circuit whereby variations in the value of said resistor will cause corresponding variations in the frequency of said oscillator, each of said bridge and said oscillator circuits secured to said rotatable member.

2. In a strain measuring system for measuring the strain on a rotatable member, a strain responsive resistor, said resistor bonded to said rotatable member, an electrical bridge circuit, said resistor comprising one arm of said bridge circuit and an oscillator circuit connected to said bridge circuit whereby variations in the value of said resistor will cause corresponding variations in the frequency of said oscillator circuit, each of said bridge and said oscillator circuits secured to said rotatable member, commutator rings, said commutator rings mounted for rotation with said rotatable member and electrically connected to said oscillator output, a frequency indicating device, and brushes connected to said frequency indicating device engaged with said commutator rings.

3. The combination of claim 1 wherein said oscillator circuit includes a transistor.

4. The combination defined in claim 1 wherein said strain indicator comprises a frequency meter.

5. A strain measuring system for measuring the torque on a rotatable member, a strain responsive resistor, means securing the resistor to the member in such a manner that the resistance of the resistor varies in proportions to the degree of said torque, a source of electrical energy carried by said member and connected to said resistor, an oscillator circuit carried by said member and connected to said resistor and to said source, said oscillator circuit including a device which causes the frequency of the circuit to vary with the change of the resistance in said resistor, an indicator remote from said member for indicating the frequency in said circuit and the torque in said member, and means for transmitting the frequency of said circuit to said indicator.

References Cited in the file of this patent

UNITED STATES PATENTS

| 2,517,133 | Porter | Aug. 1, 1950 |
| 2,531,228 | Macgeorge | Nov. 21, 1950 |
| 2,732,713 | Willits | Jan. 31, 1956 |

FOREIGN PATENTS

| 470,454 | Germany | Jan. 15, 1929 |